US009055089B2

(12) United States Patent
Willner et al.

(10) Patent No.: US 9,055,089 B2
(45) Date of Patent: Jun. 9, 2015

(54) ASSOCIATING COMMUNICATIONS IN COLLABORATION SESSIONS (75) Inventors: Barry E. Willner, Briarcliff Manor, NY (US); Patrick Joseph O'Sullivan, Ballsbridge (IE); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 13/155,091

(22) Filed: Jun. 7, 2011

(65) Prior Publication Data

US 2012/0317296 A1    Dec. 13, 2012

(51) Int. Cl.
G06F 15/16    (2006.01)
H04L 29/08    (2006.01)
H04L 12/18    (2006.01)

(52) U.S. Cl.
CPC ............ H04L 67/14 (2013.01); H04L 12/1822 (2013.01)

(58) Field of Classification Search
CPC ...... G06F 15/16; H04L 12/1822; H04L 67/14
USPC .............................................. 709/228; 70/228
See application file for complete search history.

(56) References Cited

U.S. PATENT DOCUMENTS

| | | | |
|---|---|---|---|
| 6,237,025 B1 * | 5/2001 | Ludwig et al. ................ 709/204 |
| 8,698,873 B2 * | 4/2014 | Barrus ........................ 348/14.08 |
| 2005/0021652 A1 * | 1/2005 | McCormack ................. 709/207 |
| 2005/0055416 A1 * | 3/2005 | Heikes et al. ................ 709/207 |
| 2005/0120108 A1 * | 6/2005 | Wisniewski et al. .......... 709/224 |
| 2005/0181872 A1 | 8/2005 | Acharya et al. |
| 2005/0235034 A1 * | 10/2005 | Chen et al. .................... 709/206 |
| 2005/0278413 A1 * | 12/2005 | Tannenbaum ................ 709/202 |
| 2006/0026502 A1 * | 2/2006 | Dutta ............................ 715/511 |
| 2006/0053196 A1 * | 3/2006 | Spataro et al. ................ 709/205 |
| 2007/0124387 A1 * | 5/2007 | Galloway ...................... 709/206 |
| 2007/0200914 A1 * | 8/2007 | DuMas et al. ............. 348/14.01 |
| 2008/0046828 A1 | 2/2008 | Bibliowicz et al. |
| 2008/0059539 A1 | 3/2008 | Chin et al. |
| 2008/0109406 A1 * | 5/2008 | Krishnasamy et al. ........... 707/3 |
| 2008/0189375 A1 * | 8/2008 | Chi et al. ...................... 709/206 |
| 2009/0172101 A1 * | 7/2009 | Arthursson .................... 709/205 |
| 2009/0193088 A1 * | 7/2009 | Cervantes et al. ............ 709/206 |
| 2009/0254840 A1 * | 10/2009 | Churchill et al. ............. 715/753 |

(Continued)

OTHER PUBLICATIONS

IBM, A Method for Collaborative Document Creation in a Distributed Environment, IP.com, IPCOM000126799D, Aug. 2, 2005; 3 pages.

(Continued)

*Primary Examiner* — Guang Li
(74) *Attorney, Agent, or Firm* — Holland & Knight LLP; Brian J. Colandreo, Esq.; Jeffrey T. Placker, Esq.

(57) ABSTRACT

A method, computer program product, and system for associating communications in collaboration sessions is described. A method may comprise displaying, via one or more computing devices, a document accessible to one or more collaborators of a first collaboration session. The method may further comprise associating, via the one or more computing devices, a first communication session of the first collaboration session with a first portion of the document. The method may additionally comprise indicating, via the one or more computing devices, the association between the first communication session of the first collaboration session and the first portion of the document.

20 Claims, 7 Drawing Sheets

(56) References Cited

U.S. PATENT DOCUMENTS

| | | | |
|---|---|---|---|
| 2010/0070844 A1* | 3/2010 | Aymeloglu et al. | 715/229 |
| 2010/0083136 A1 | 4/2010 | Komine et al. | |
| 2010/0235523 A1* | 9/2010 | Garcia et al. | 709/228 |
| 2011/0289150 A1* | 11/2011 | Westaway et al. | 709/205 |
| 2013/0080920 A1* | 3/2013 | Heikes et al. | 715/753 |
| 2013/0132485 A1* | 5/2013 | Thomas et al. | 709/205 |

OTHER PUBLICATIONS

IBM, System and Method for Document Based Collaboration in the Context of Instant Messaging, IP.com, IPCOM000183571D, May 28, 2009, 6 pages.

* cited by examiner

ASSOCIATING COMMUNICATIONS IN COLLABORATION SESSIONS

BACKGROUND OF THE INVENTION

One or more collaborating users may collaborate on drafting, editing, and/or revising a document. These users may collaborate on the document via one or more communication mediums such as instant messaging communication, chat session communication, telephone communication, and/or video communication. Further, these users may collaborate on the document while viewing and/or making changes to the document in an e-meeting environment, an application sharing environment and/or a unified communications and collaboration application.

BRIEF SUMMARY OF THE INVENTION

In a first embodiment, a method may include displaying, via one or more computing devices, a document accessible to one or more collaborators of a first collaboration session. The method may further include associating, via the one or more computing devices, a first communication session of the first collaboration session with a first portion of the document. The method may also include indicating, via the one or more computing devices, the association between the first communication session of the first collaboration session and the first portion of the document.

One or more of the following features may be included. The method may include initiating the first communication session of the first collaboration session in response to receiving a selection from one of the one more collaborators of the first collaboration session, the selection indicating that the first portion of the document is to be associated with the first communication session of the first collaboration session. Indicating the association may include displaying the first communication session of the first collaboration session proximate to the first portion of the document. Indicating the association may further include rendering a visual indication of the association between the first communication session of the first collaboration session and the first portion of the document. The visual indication may include, at least in part, at least one of: a line indication, an arrow indication, a circle indication, and a color indication.

In an implementation, the first communication session of the first collaboration session may include at least one of: a chat session communication, an instant message communication, a telephonic communication, and a video communication. The method may include storing the association between the first communication session of the first collaboration session and the first portion of the document. The method may additionally include associating a second communication session of a second collaboration session with a second portion of the document, wherein the document is accessible to one or more collaborators of a second collaboration session. The method may also include indicating the association between the second communication session of the second collaboration session and the second portion of the document. Moreover, at least part of the first communication session of the first collaboration session associated with the first portion of the document and at least part of the second communication session of the second collaboration session associated with the second portion of the document may occur at the same time.

In a second embodiment, a computer program product may reside on a computer readable storage medium and may have a plurality of instructions stored on it. When executed by a processor, the instructions may cause the processor to perform operations including displaying a document accessible to one or more collaborators of a first collaboration session. The operations may further include associating a first communication session of the first collaboration session with a first portion of the document. The operations may also include indicating the association between the first communication session of the first collaboration session and the first portion of the document.

One or more of the following features may be included. The operations may include initiating the first communication session of the first collaboration session in response to receiving a selection from one of the one more collaborators of the first collaboration session, the selection indicating that the first portion of the document is to be associated with the first communication session of the first collaboration session. Indicating the association may include displaying the first communication session of the first collaboration session proximate to the first portion of the document. Indicating the association may also include rendering a visual indication of the association between the first communication session of the first collaboration session and the first portion of the document. The visual indication may include, at least in part, at least one of: a line indication, an arrow indication, a circle indication, and a color indication.

In an implementation, the first communication session of the first collaboration session may include at least one of: a chat session communication, an instant message communication, a telephonic communication, and a video communication. The operations may include storing the association between the first communication session of the first collaboration session and the first portion of the document. The operations may also include associating a second communication session of a second collaboration session with a second portion of the document, wherein the document is accessible to one or more collaborators of a second collaboration session. The operations may additionally include indicating the association between the second communication session of the second collaboration session and the second portion of the document. At least part of the first communication session of the first collaboration session associated with the first portion of the document and at least part of the second communication session of the second collaboration session associated with the second portion of the document may occur at the same time.

In a third embodiment, a computing system is provided. The computing system may include at least one processor and at least one memory architecture coupled with the at least one processor. The computing system may also include a first software module executable by the at least one processor and the at least one memory architecture, wherein the first software module may be configured to display a document accessible to one or more collaborators of a first collaboration session. Further, the computing system may include a second software module which may be configured to associate a first communication session of the first collaboration session with a first portion of the document. Additionally, the computing system may include a third software module which may be configured to indicate the association between the first communication session of the first collaboration session and the first portion of the document.

One or more of the following features may be included. The computing system may include a fourth software module which may be configured to initiate the first communication session of the first collaboration session in response to receiving a selection from one of the one more collaborators of the first collaboration session, the selection may indicate that the first portion of the document is to be associated with the first communication session of the first collaboration session. The third software module configured to indicate the association may be further configured to display the first communication session of the first collaboration session proximate to the first portion of the document. The third software module configured to indicate the association may also be further configured to render a visual indication of the association between the first communication session of the first collaboration session and the first portion of the document.

In an implementation, the visual indication may include, at least in part, at least one of: a line indication, an arrow indication, a circle indication, and a color indication. The first communication session of the first collaboration session may include at least one of: a chat session communication, an instant message communication, a telephonic communication, and a video communication. The computing system may include a fifth software module which may be configured to store the association between the first communication session of the first collaboration session and the first portion of the document.

The details of one or more implementations are set forth in the accompanying drawings and the description below. Other features and advantages will become apparent from the description, the drawings, and the claims.

DETAILED DESCRIPTION OF THE INVENTION

Figure 1:
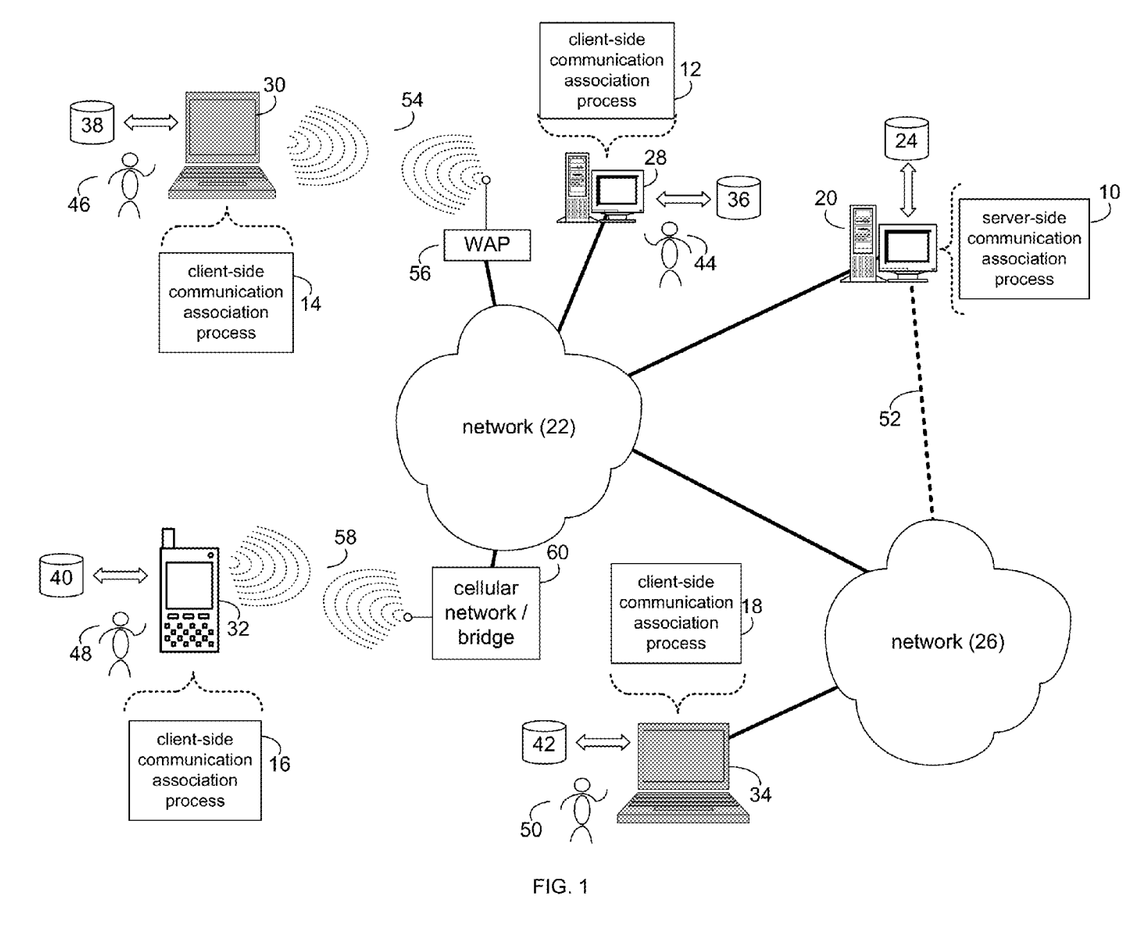
FIG. 1 is a diagrammatic view of a communication association process coupled to a distributed computing network.
Figure 2:
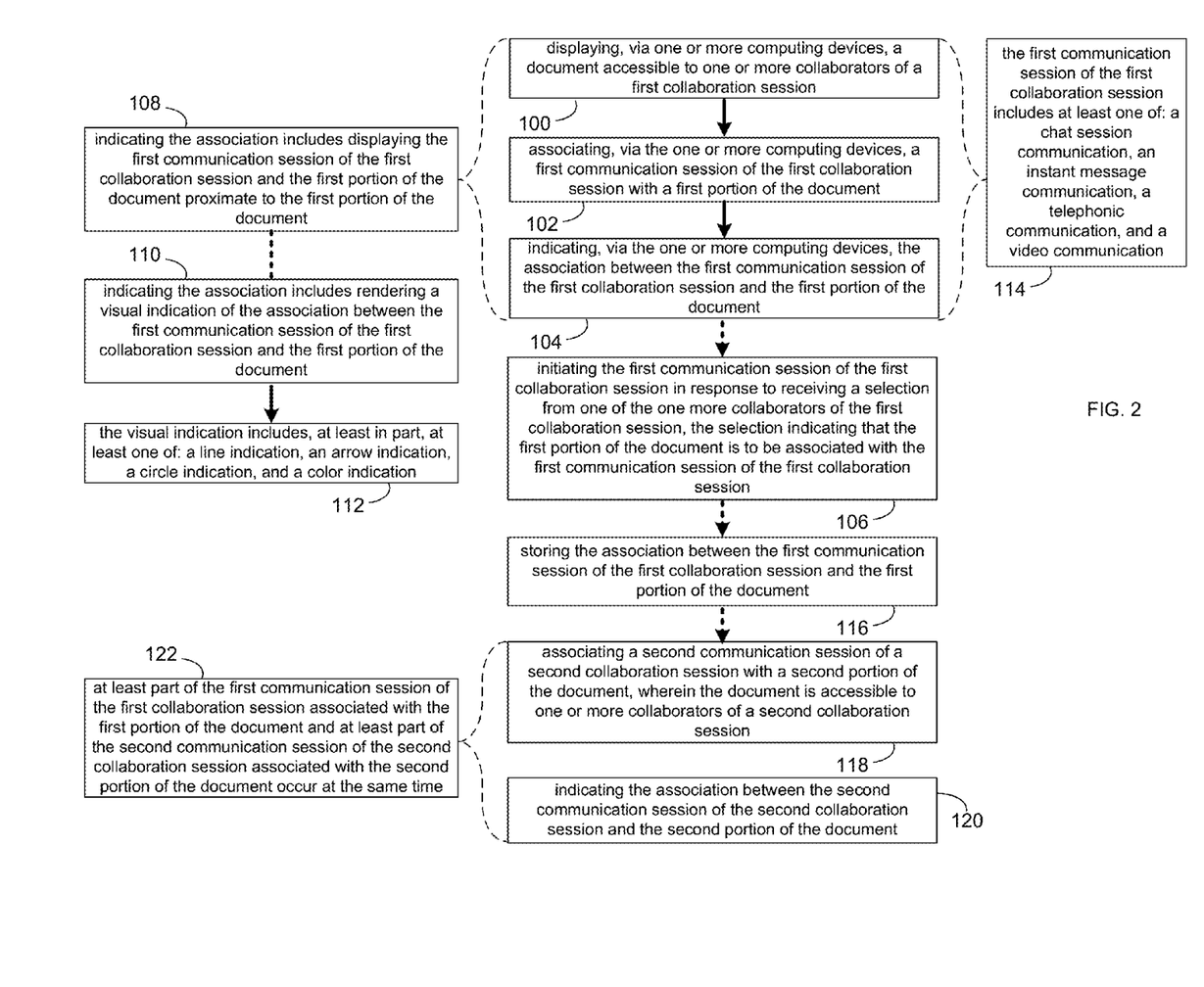
FIG. 2 is a flowchart of the communication association process of FIG. 1.

Referring to FIGS. 1 & 2, there is shown a communication association process 10. As will be discussed below, communication association process 10 may display 100, a document accessible to one or more collaborators of a first collaboration session. Communication association process 10 may also associate 102 a first communication session of the first collaboration session with a first portion of the document. Communication association process 10 may further indicate 104 the association between the first communication session of the first collaboration session and the first portion of the document.

The communication association (CA) process may be a server-side process (e.g., server-side CA process 10), a client-side process (e.g., client-side CA process 12, client-side CA process 14, client-side CA process 16, or client-side CA process 18), or a hybrid server-side/client-side process (e.g., the combination of server-side CA process 10 and one or more of client-side CA processes 12, 14, 16, 18).

Server-side CA process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side CA process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side CA processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side CA processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side CA processes 12, 14, 16, 18 and/or server-side CA process 10 may be processes that run within (i.e., are part of) a unified communications and collaboration application, which may be configured for instant messaging, chat, unified telephony and/or VoIP conferencing, and/or video communication (e.g., Lotus® Sametime®). Alternatively, client-side CA processes 12, 14, 16, 18 and/or server-side CA process 10 may be stand-alone applications that work in conjunction with the unified communications and collaboration application. One or more of client-side CA processes 12, 14, 16, 18 and server-side CA process 10 may interface with each other (via network 22 and/or network 26). CA process 10 may also run within any e-meeting application, web-conferencing application, and/or application sharing environment configured for allowing users to collaborate on documents.

Users 44, 46, 48, 50 may access server-side CA process 10 directly through the device on which the client-side CA process (e.g., client-side CA processes 12, 14, 16, 18) is executed, namely client electronic devices 28, 30, 32, 34, for example. Users 44, 46, 48, 50 may access server-side CA process 10 directly through network 22 and/or through secondary network 26. Further, server computer 20 (i.e., the computer that executes server-side CA process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Communication Association (CA) Process

For the following discussion, server-side CA process 10 will be described for illustrative purposes. It should be noted that client-side CA process 12 may interact with server-side CA process 10 and may be executed within one or more applications that allow for communication with client-side CA process 12. However, this is not intended to be a limitation of this disclosure, as other configurations are possible (e.g., stand-alone, client-side CA processes and/or stand-alone server-side CA processes.) For example, some implementations may include one or more of client-side CA processes 12, 14, 16, 18 in place of or in addition to server-side CA process 10.

Figure 3:
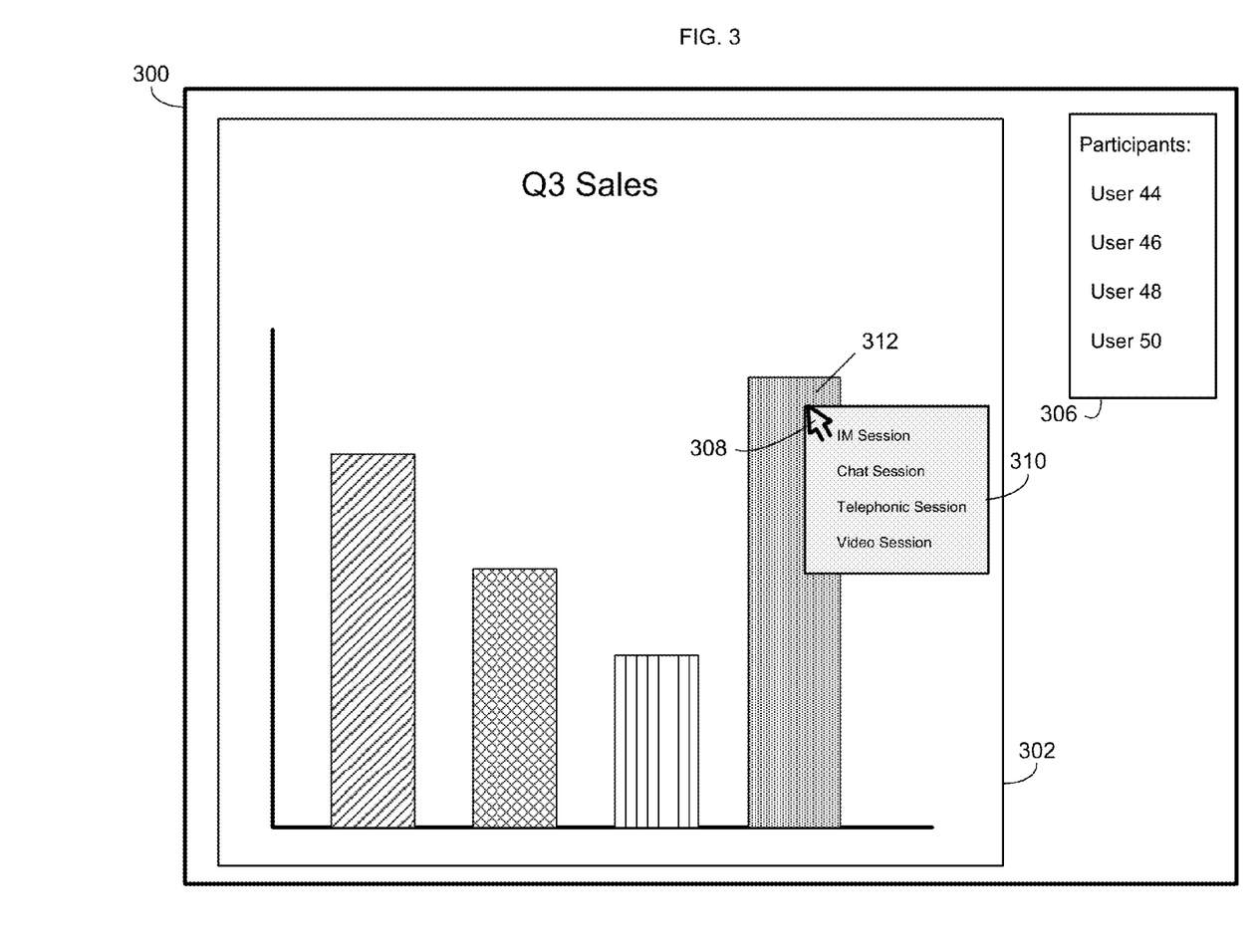
FIG. 3 is a diagrammatic view of an exemplary collaboration session associated with the communication association process of FIG. 1.

Referring now to FIGS. 1-3, one or more of users 44, 46, 48, and 50 may be collaborators in a collaboration session. The collaboration session may be held via an e-meeting application, web-conferencing application, and/or application sharing environment configured for allowing users to collaborate on documents. For example, collaboration session 300 may be conducted via a unified communications and collaboration application (e.g., Lotus® Sametime®) which may be configured for instant messaging, chat, unified telephony and/or VoIP conferencing and/or video conferencing. Collaboration session 300 may be a conference, meeting, presentation, or other type of collaborative gathering.

Further, collaboration session 300 may be attended online, and collaborators may communicate over one or more of instant messaging, chat, unified telephony and/or VoIP conferencing and/or video conferencing. Video and/or audio associated with collaboration session 300 may be transmitted to the one or more collaborators (e.g., one or more of users 44, 46, 48, 50). In an implementation, audio associated with collaboration session 300 may be streamed to many collaborators (e.g., one or more of users 44, 46, 48, 50) or may be accessed via a VoIP conferencing application. Additionally, in an implementation, collaboration session 300 may occur in an environment configured to allow one or more collaborators (e.g., one or more of users 44, 46, 48, 50) to view and/or access the same document (e.g., via an application sharing program) and collaborate on the document via an instant messaging and/or chat application (e.g., Lotus® Sametime®). The application sharing program and/or instant messaging and/or chat application may be separate applications.

The collaborators may collaborate on a document (e.g., document 302) via collaboration session 300 and may have important conversations and/or communications regarding document 302. For example, one or more of users 44, 46, 48, 50 may drag document 302 (e.g., a presentation document) into collaboration session 300 (e.g., via an e-meeting application), which may then be provided for the rest of the users to view and/or access. Further, the collaborators may comment on and/or edit and/or revise one or more portions of document 302 in connection with their conversations/communications about those one or more portions of document 302. Subsequently, the collaborators, or other users, may wish to look back at their conversations/communications about those one or more portions of document 302 that were commented on, edited, and/or revised. CA process 10 may allow users to view and/or access their conversations/communications regarding specific portions of document 302 in such a way that indicates to the users which portion of document 302 they were conversing and/or communicating about.

CA process 10 may display 100 a document (e.g., document 302) accessible to one or more collaborators (e.g., one or more of users 44, 46, 48, 50) of a first collaboration session (e.g., collaboration session 300). Document 302 may be one or more of a word processing document, a spreadsheet, a presentation document, a drawing, a blueprint, or any other document viewable via an application sharing program. Assume for illustrative purposes only that one or more of users 44, 46, 48, 50 collaborate about document 302 via an application sharing program (e.g., configured to allow one or more of users 44, 46, 48, 50 to view document 302). CA process 10 may allow one or more collaborators (e.g., user 46) to view (e.g., by right-clicking near portion 312 via cursor 308) pop-up menu 310. Pop-up menu 310 may allow user 46 to choose a communication mode (e.g., an IM session, chat session, telephonic session, and/or video session) through which to communicate with one or more other collaborators (e.g., one or more of users 44, 48, 50) of collaboration session 300. Pop-up menu 310 may also be made available to user 46 if user 46 selects (e.g., circles and/or highlights portion 312 via cursor 308).

Figure 4:
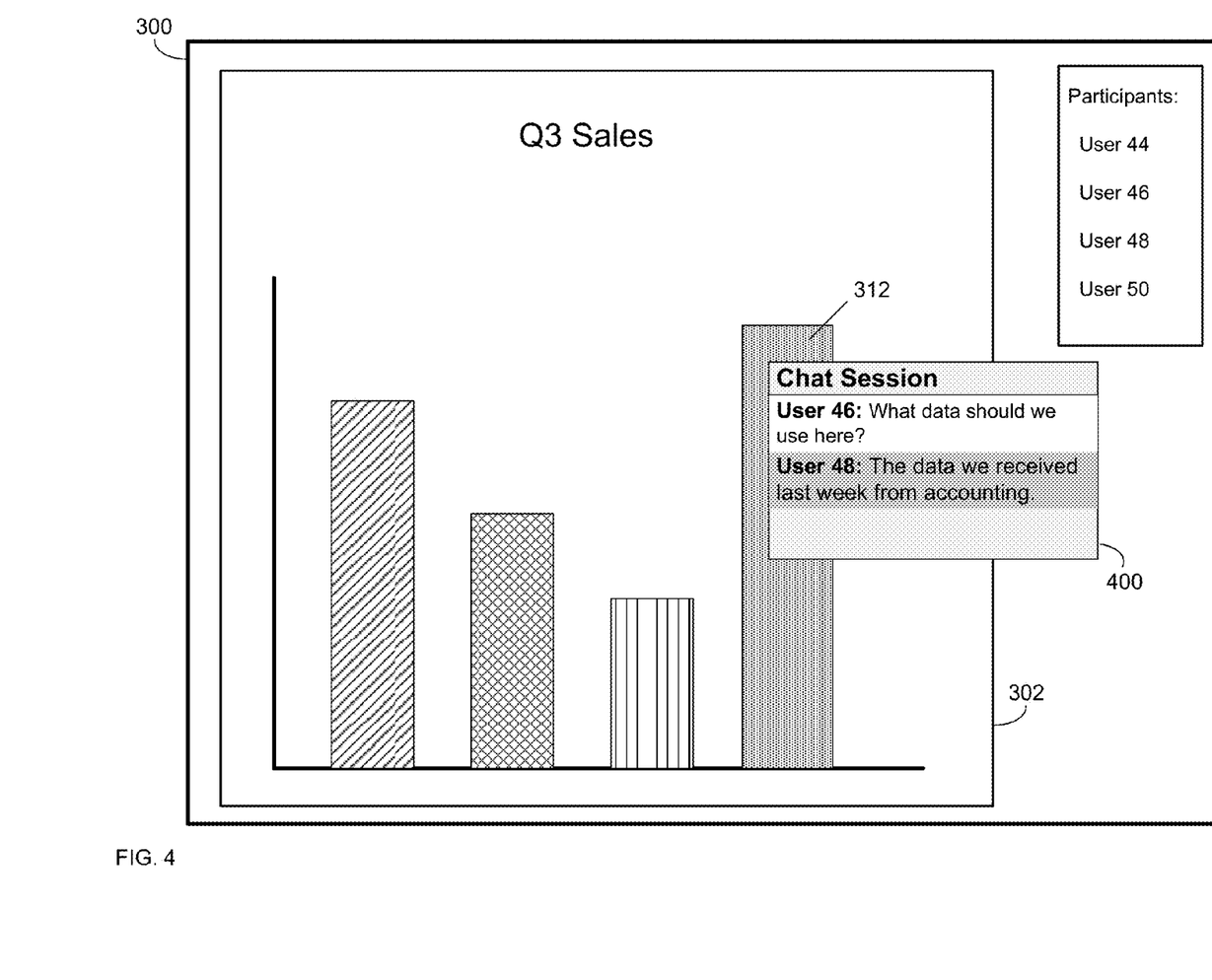
FIG. 4 is also a diagrammatic view of an exemplary collaboration session associated with the communication association process of FIG. 1.

Referring now also to FIG. 4, CA process 10 may initiate 106 the first communication session (e.g., chat session communication 400) of the first collaboration session (e.g., collaboration session 300) in response to receiving a selection from one of the one more collaborators (e.g., user 46) of the first collaboration session (e.g., collaboration session 300), the selection indicating that the first portion (e.g., portion 312) of the document (e.g., document 302) is to be associated with the first communication session (e.g., chat session communication 400) of the first collaboration session (e.g., collaboration session 300). For example, in response to user 46 selecting "Chat Session" via pop-up menu 310, CA process 10 may initiate chat session communication 400 between the collaborators (e.g., one or more of users 44, 46, 48, 50). Chat session communication 400 will be discussed below for exemplary purposes only, as the first communication session of the first collaboration session may include (114) at least one of: a chat session communication, an instant message communication, a telephonic communication, and a video communication.

Further, CA process 10 may associate 102 a first communication session (e.g., chat session communication 400) of the first collaboration session (e.g., collaboration session 300) with a first portion (e.g., portion 312) of the document (e.g., document 302). Assume for illustrative purposes only that user 46 selects "Chat Session" via pop-up menu 310. In response to user 46 selecting "Chat Session" via pop-up menu 310, CA process 10 may associate 102 chat session communication 400 with portion 312 of document 302. One or more collaborators (e.g., users 46, 48) may collaborate on portion 312 of document 302 via chat session communication 400. CA process 10 may indicate 104 the association between the first communication session (e.g., chat session communication 400) of the first collaboration session (e.g., collaboration session 300) and the first portion (e.g., portion 312) of the document (e.g., document 302).

In an implementation, indicating 104 the association may include displaying 108 the first communication session (e.g., chat session communication 400) of the first collaboration session (e.g., collaboration session 300) proximate to the first portion (e.g., portion 312) of the document (e.g., document 302). As shown in FIG. 4, CA process 10 may display chat session communication 400 close enough to portion 312 so as to indicate 104 to users that chat session communication 400 is associated 102 with portion 312 of document 300. Further, and referring also to FIG. 5, in an implementation, indicating 104 the association may include rendering 110 a visual indication (e.g., line 500) of the association between the first communication session (e.g., chat session communication 400) of the first collaboration session (e.g., collaboration session 300) and the first portion (e.g., portion 312) of the document (e.g., document 302). The visual indication may include (112), at least in part, at least one of: a line indication (e.g., line 500), an arrow indication (e.g., one or more of arrow indications 502 and 504), a circle indication, and a color indication.

CA process 10 may store 116 the association between the first communication session (e.g., chat session communication 400) of the first collaboration session (e.g., collaboration session 300) and the first portion (e.g., portion 312) of the document (e.g., document 302). For example, CA process 10 may store information sufficient to link chat session communication 400 and portion 312 of document 302 such that one or more collaborators may subsequently retrieve chat session communication 400 when viewing portion 312. CA process 10 may store x and y coordinates of portion 312 in connection with chat session communication 400 with metadata associated with chat session 400. Further, when document 302 is subsequently opened, chat session communication 400 may automatically appear in proximity to portion 312 of document 302, as shown in FIG. 4.

Figure 5:
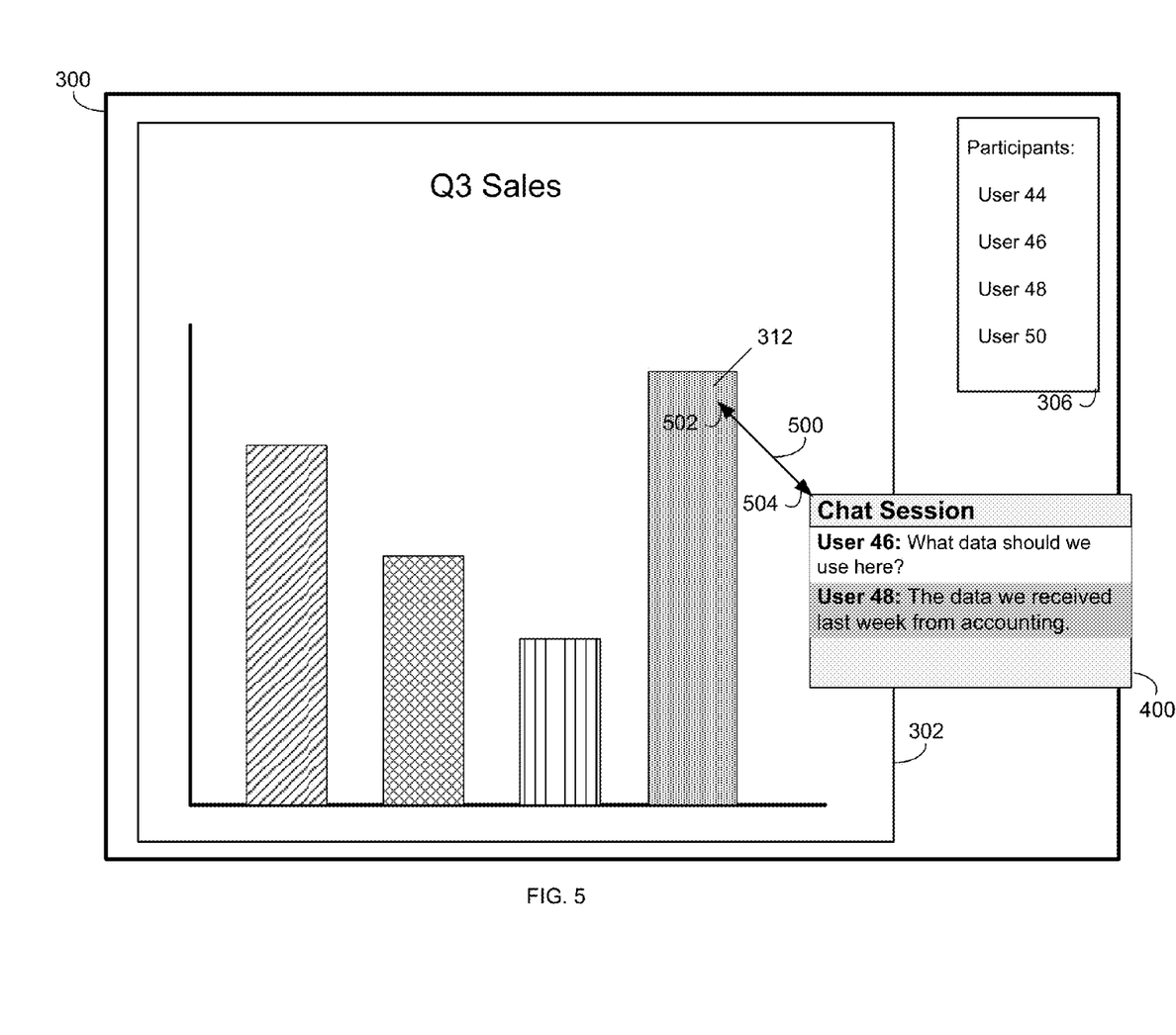
FIG. 5 is also a diagrammatic view of an exemplary collaboration session associated with the communication association process of FIG. 1.

In an implementation, when document 302 is subsequently opened, CA process 10 may provide an icon (not shown) in proximity to portion 312 of document 302 indicating that a communication took place regarding that portion. A user (e.g., one or more of users 44, 46, 48, 50) may select the icon and retrieve the communication (e.g., chat session communication 400) for viewing. For example, if a telephonic communication took place regarding portion 312, CA process 10 may provide a small telephone icon in proximity to portion 312 such that if a user clicks on the small telephone icon, the audio of the telephonic communication will be rendered for the user. Additionally, when document 302 is subsequently opened, a visual indication of the association (e.g., line 500 and/or one or more of arrow indications 502 and 504) and chat session communication 400 may automatically appear, as shown in FIG. 5. In this way, CA process 10 may allow collaborators to subsequently view communications regarding portions of documents such that there is an indication that specific communications are associated with specific portions of documents. Further, in an implementation portion 312 may be highlighted with a certain color and chat session communication 400 may be displayed with that color in the background or in the border, in order to show the association between chat session 400 and portion 312.

In an implementation, when collaboration session 300 is finished, CA process 10 may save an object and/or file associated with chat session communication 400. A user may subsequently select and open the object and/or file associated with chat session communication 400. In response, CA process 10 may open a transcript of chat session communication 400 and document 302, and may display the transcript of chat session communication 400 proximate to portion 312, indicating that portion 312 was discussed in chat session communication 400.

Figure 6:
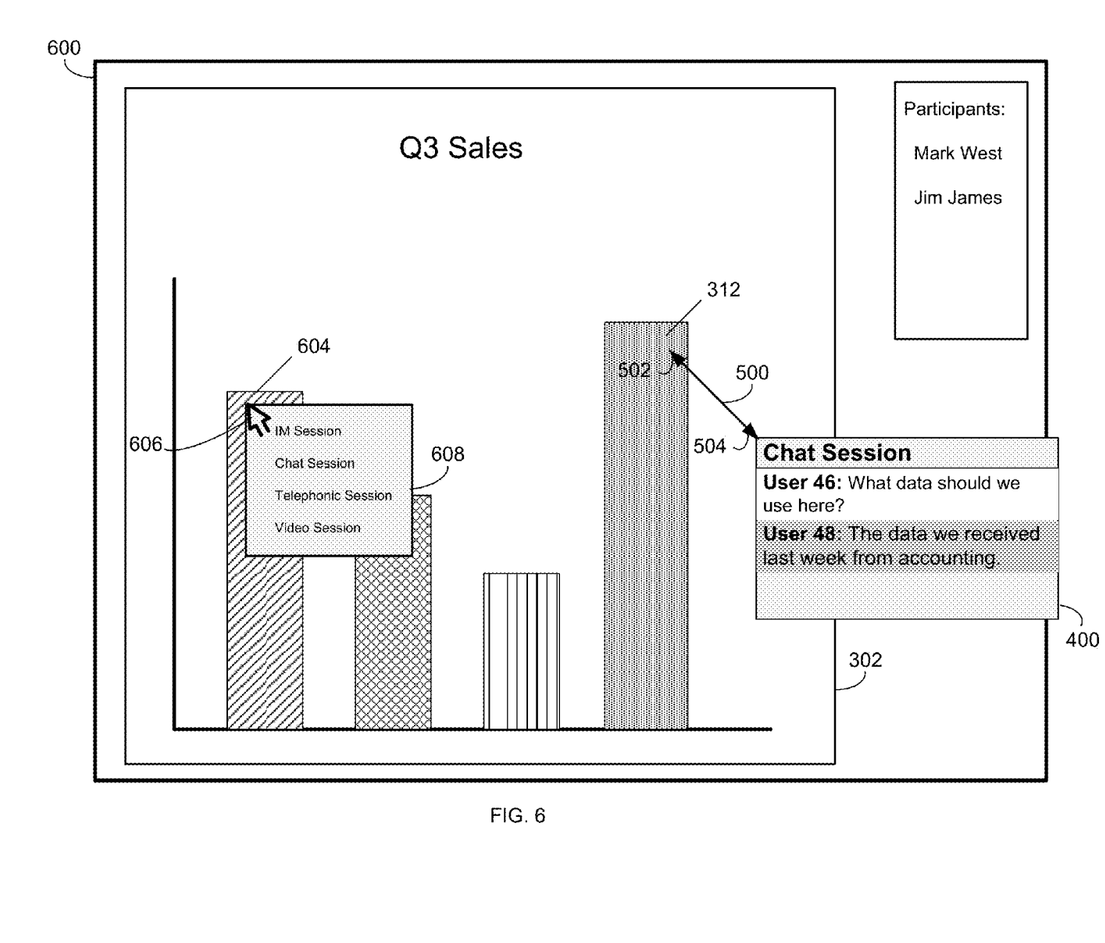
FIG. 6 is also a diagrammatic view of an exemplary collaboration session associated with the communication association process of FIG. 1.
Figure 7:
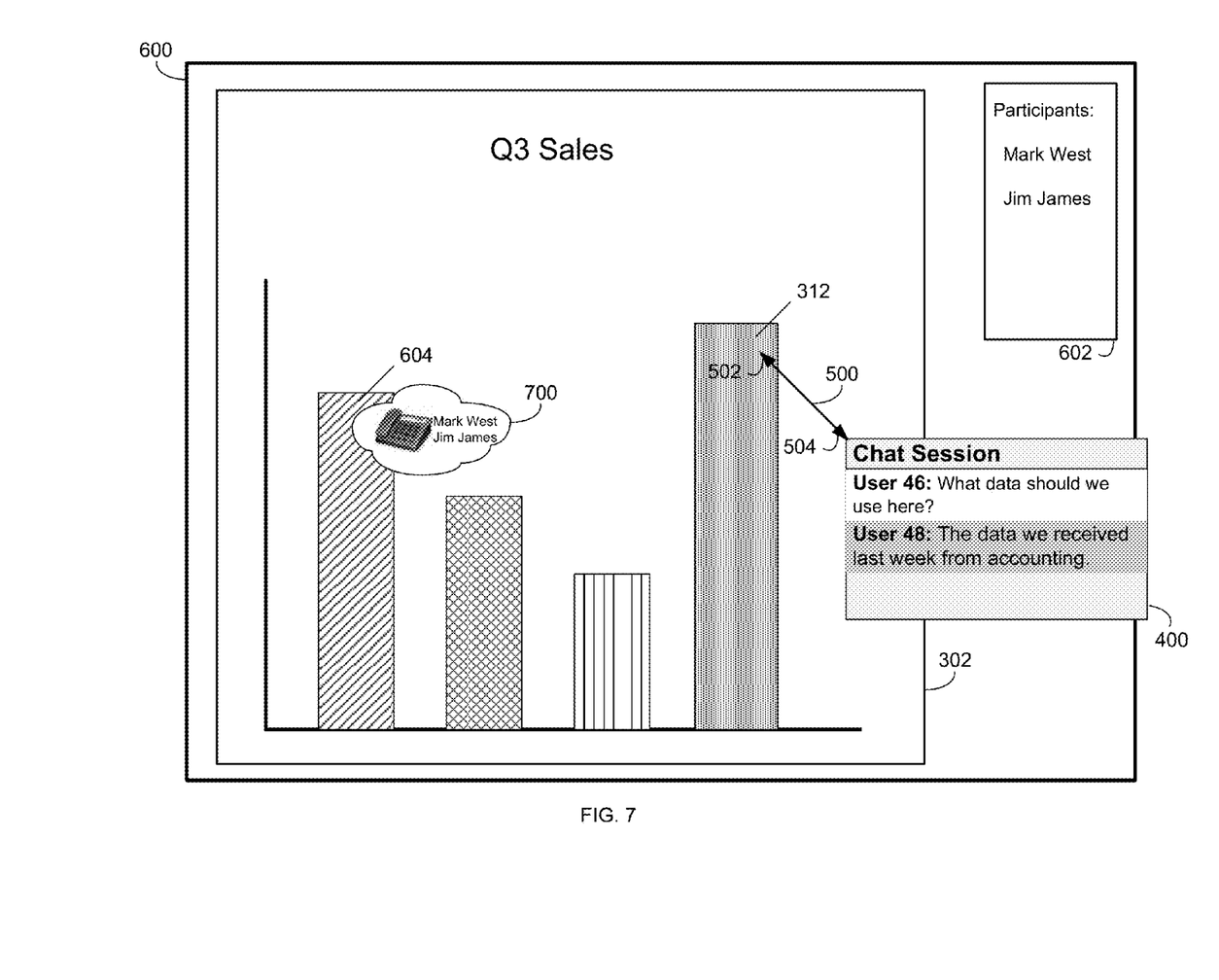
FIG. 7 is also a diagrammatic view of an exemplary collaboration session associated with the communication association process of FIG. 1.

Referring now also to FIGS. 6 and 7, CA process 10 may associate 118 a second communication session (e.g., a telephonic communication session as indicated by icon 700) of a second collaboration session (e.g., collaboration session 600 with collaborators Mark West and/Jim James) with a second portion of the document (e.g., portion 604), wherein the document (e.g., document 302) is accessible to one or more collaborators (e.g., Mark West, Jim James) of a second collaboration session (e.g., collaboration session 600). For example, CA process 10 may allow one or more collaborators (e.g., Mark West, Jim James) to view (e.g., by right-clicking via cursor 606) pop-up menu 608. Pop-up menu 608 may allow a user (e.g., Mark West) to choose a communication mode (e.g., an IM session, chat session, telephonic session, and/or video session) through which to communicate with one or more other collaborators (e.g., Jim James) of a second collaboration session collaboration session 600.

CA process 10 may initiate the second communication session (e.g., a telephonic session communication with collaborating users Mark West and Jim James as shown by icon 700) of the second collaboration session (e.g., collaboration session 600) in response to receiving a selection from one of the one more collaborators (e.g., Mark West) of the second collaboration session, the selection indicating that the second portion (e.g., portion 604) of the document (e.g., document 302) is to be associated with the second communication session (e.g., a telephonic session communication with collaborating users Mark West and Jim James as shown in icon 700) of the second collaboration session (e.g., collaboration session 600). For example, in response to Mark West selecting "Telephonic Session" via pop-up menu 608, CA process 10 may initiate a telephonic session communication between Mark West and other collaborators of collaboration session 600 (e.g., Jim James). The telephonic session communication may be held via any application configured for IP telephony and/or a traditional phone line. For example, a traditional phone call may be recorded and associated with portion 604.

Further, CA process 10 may indicate 120 the association between the second communication session (e.g., the telephonic session communication with collaborating users Mark West and Jim James as shown in icon 700) of the second collaboration session (e.g., collaboration session 600) and the second portion (e.g., portion 604) of the document (e.g., document 302). For example, CA process 10 may provide icon 700 indicating 120 the association between the telephonic communication session with collaborating users Mark West and Jim James and portion 604 of document 302. Additionally, in an implementation, when document 302 is subsequently opened, CA process 10 may provide icon 700 in proximity to portion 604 of document 302 indicating that a telephonic session communication took place regarding portion 604. A user (e.g., one or more of users 44, 46, 48, 50, Mark West, Jim James) may select icon 700 and retrieve the telephonic session communication between Mark West and Jim James for listening. For example, if one or more of users 44, 46, 48, 50, Mark West and/or Jim James select icon 700, audio associated with the telephonic communication between Mark West and James regarding portion 604 of document 302 may be rendered.

In an implementation, at least part of the first communication session (e.g., chat session communication 400) of the first collaboration session (e.g., collaboration session 300) associated with the first portion (e.g., portion 312) of the document (e.g., document 300) and at least part of the second communication session (e.g., the telephonic session communication with collaborating users Mark West and Jim James as shown in icon 700) of the second collaboration session (e.g., collaboration session 600) associated with the second portion (e.g., portion 604) of the document (e.g., document 302) may occur at the same time. In other words, one or more of users 44, 46, 48, and 50 may be collaborating on document 302 via chat session communication 400 while, at the same time, Mark West and Jim James may be collaborating on document 302 via the telephonic communication session as indicated by icon 700. As shown in FIG. 7, while viewing document 302 via, e.g., an application sharing program, one or more of users 44, 46, 48, and 50 may select icon 700. Further, one or more of users 44, 46, 48, 50 may enter the telephonic communication session between Mark West and Jim James through, e.g., a graphical user interface that may be available by selecting icon 700. Similarly, and as shown in FIG. 7, while viewing document 302 via, e.g., an application sharing program, one or more of Mark West and Jim James may select chat session communication 400, line 500, and/or one or more of arrows 502 and 504, and may enter chat session communication 400 through, e.g., a graphical user interface that may be available by selecting one or more of chat session communication 400, line 500, and/or one or more of arrows 502 and 504.

In an implementation, an application sharing program through which one or more users may collaborate on a document may be a multi-user application supporting multiple cursors (e.g., cursors 308 and/or 606) and may allow for multiple updates of the document to occur simultaneously. In this way, each collaboration session may be associated with a different cursor through which multiple simultaneous updates may be made. Further, the visual appearance for each collaboration session may be different. For example, one group of collaborators may be working on and seeing page 3, while another group of collaborators may be working on and seeing page 4. In an implementation, the ability to use multiple cursors and make multiple simultaneous updates may be provided by CA process 10, which may keep track of each collaboration with each cursor and each update. Further, in an implementation, editing of the document being collaborated upon may be server-based and/or client-based, where a common copy may be stored on a server, multiple copies may be synchronously updated, and/or a check-in and check-out system may be utilized.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
    displaying, via one or more computing devices, a document accessible to one or more collaborators of a first collaboration session, wherein the document is one of: a word processing document, a spreadsheet, a presentation document, a drawing, and a blueprint, wherein the document is separate from the first collaboration session;
    associating, via the one or more computing devices, a first communication session of the first collaboration session with a first portion of the document;
    indicating, via the one or more computing devices, the association between the first communication session of the first collaboration session and the first portion of the document, wherein indicating the association includes rendering, on the document, a visual indication of the association between the first communication session of the first collaboration session and the first portion of the document; and
    associating, via the one or more computing devices, a second communication session of a second collaboration session with a second portion of the document, wherein the document is accessible to one or more collaborators of a second collaboration session;
    wherein at least part of the first communication session of the first collaboration session associated with the first portion of the document and at least part of the second communication session of the second collaboration session associated with the second portion of the document occur at the same time;
    wherein different users are included within the first communication session of the first collaboration session and the second communication session of the second collaboration session.

2. The method of claim 1, further comprising:
    initiating the first communication session of the first collaboration session in response to receiving a selection from one of the one more collaborators of the first collaboration session, the selection indicating that the first portion of the document is to be associated with the first communication session of the first collaboration session.

3. The method of claim 1, wherein indicating the association includes displaying the first communication session of the first collaboration session proximate to the first portion of the document.

4. The method of claim 1, wherein the visual indication on the document includes, at least in part, at least one of: a line indication, an arrow indication, a circle indication, and a color indication.

5. The method of claim 1, wherein the first communication session of the first collaboration session includes at least one of: a chat session communication, an instant message communication, a telephonic communication, and a video communication.

6. The method of claim 1, further comprising:
    storing the association between the first communication session of the first collaboration session and the first portion of the document.

7. The method of claim 1, further comprising:
    indicating the association between the second communication session of the second collaboration session and the second portion of the document.

8. A computer program product residing on a non-transitory computer readable storage medium having a plurality of instructions stored thereon, which, when executed by a processor, cause the processor to perform operations comprising:
    displaying a document accessible to one or more collaborators of a first collaboration session, wherein the document is one of: a word processing document, a spreadsheet, a presentation document, a drawing, and a blueprint, wherein the document is separate from the first collaboration session;
    associating a first communication session of the first collaboration session with a first portion of the document;

indicating the association between the first communication session of the first collaboration session and the first portion of the document, wherein indicating the association includes rendering, on the document, a visual indication of the association between the first communication session of the first collaboration session and the first portion of the document; and associating a second communication session of a second collaboration session with a second portion of the document, wherein the document is accessible to one or more collaborators of a second collaboration session;

wherein at least part of the first communication session of the first collaboration session associated with the first portion of the document and at least part of the second communication session of the second collaboration session associated with the second portion of the document occur at the same time;

wherein different users are included within the first communication session of the first collaboration session and the second communication session of the second collaboration session.

9. The computer program product of claim 8, further comprising:

initiating the first communication session of the first collaboration session in response to receiving a selection from one of the one more collaborators of the first collaboration session, the selection indicating that the first portion of the document is to be associated with the first communication session of the first collaboration session.

10. The computer program product of claim 8, wherein indicating the association includes displaying the first communication session of the first collaboration session and proximate to the first portion of the document.

11. The computer program product of claim 8, wherein the visual indication on the document includes, at least in part, at least one of: a line indication, an arrow indication, a circle indication, and a color indication.

12. The computer program product of claim 8, wherein the first communication session of the first collaboration session includes at least one of: a chat session communication, an instant message communication, a telephonic communication, and a video communication.

13. The computer program product of claim 8, further comprising:

storing the association between the first communication session of the first collaboration session and the first portion of the document.

14. The computer program product of claim 8, further comprising:

indicating the association between the second communication session of the second collaboration session and the second portion of the document.

15. A computing system comprising:

at least one processor;

at least one memory architecture coupled with the at least one processor;

a first software module executable by the at least one processor and the at least one memory architecture, wherein the first software module is configured to display a document accessible to one or more collaborators of a first collaboration session, wherein the document is one of: a word processing document, a spreadsheet, a presentation document, a drawing, and a blueprint, wherein the document is separate from the first collaboration session;

a second software module executable by the at least one processor and the at least one memory architecture, wherein the second software module is configured to associate a first communication session of the first collaboration session with a first portion of the document;

a third software module executable by the at least one processor and the at least one memory architecture, wherein the third software module is configured to indicate the association between the first communication session of the first collaboration session and the first portion of the document, wherein indicating the association includes rendering, on the document, a visual indication of the association between the first communication session of the first collaboration session and the first portion of the document; and a fourth software module executable by the at least one processor and the at least one memory architecture, wherein the fourth software module is configured to associate a second communication session of a second collaboration session with a second portion of the document, wherein the document is accessible to one or more collaborators of a second collaboration session;

wherein at least part of the first communication session of the first collaboration session associated with the first portion of the document and at least part of the second communication session of the second collaboration session associated with the second portion of the document occur at the same time;

wherein different users are included within the first communication session of the first collaboration session and the second communication session of the second collaboration session.

16. The computing system of claim 15, further comprising:

a fifth software module executable by the at least one processor and the at least one memory architecture, wherein the fifth software module is configured to initiate the first communication session of the first collaboration session in response to receiving a selection from one of the one more collaborators of the first collaboration session, the selection indicating that the first portion of the document is to be associated with the first communication session of the first collaboration session.

17. The computing system of claim 15, wherein the third software module configured to indicate the association is further configured to display the first communication session of the first collaboration session proximate to the first portion of the document.

18. The computing system of claim 15, wherein the visual indication on the document includes, at least in part, at least one of: a line indication, an arrow indication, a circle indication, and a color indication.

19. The computing system of claim 15, wherein the first communication session of the first collaboration session includes at least one of: a chat session communication, an instant message communication, a telephonic communication, and a video communication.

20. The computing system of claim 15, further comprising:

a sixth software module executable by the at least one processor and the at least one memory architecture, wherein the sixth software module is configured to store the association between the first communication session of the first collaboration session and the first portion of the document.

* * * * *